United States Patent [19]

Perkins et al.

[11] 4,391,136
[45] Jul. 5, 1983

[54] THREE-AXIS CURRENT METER

[75] Inventors: Henry T. Perkins, Slidell, La.; Kim D. Saunders, Picayune, Miss.; Albert W. Green, Slidell, La.

[73] Assignee: The United States of America as represented by the Secretary of the Navy, Washington, D.C.

[21] Appl. No.: 274,857

[22] Filed: Jun. 18, 1981

[51] Int. Cl.³ .......................... G01P 5/18; G01P 13/02
[52] U.S. Cl. .................................. 73/189; 73/170 A; 73/861.27
[58] Field of Search ..................... 73/170 A, 181, 189, 73/861.27

[56] References Cited
U.S. PATENT DOCUMENTS 3,435,677  4/1969  Gardner .............................. 73/189
4,038,870  8/1977  Rotier ................................. 73/181

OTHER PUBLICATIONS

Gytre–Radio and Electronic Engineer, vol. 46, No. 12, pp. 617–623, Dec. 1976.
1976 Article Entitled "A Three-Axis Acoustic Current Meter for Small Scale Turbulence" by Neil L. Brown et al in ISA ASI 76269.

Primary Examiner—Charles A. Ruehl
Attorney, Agent, or Firm—R. F. Beers; Francis I. Gray

[57] ABSTRACT

A three-axis current meter for measuring all three components of current velocity in the absence of self-interference caused by the sensor supports. Acoustic transducers for measuring the current components are mounted in "fingers" which are pointed in the upstream direction. Two of the acoustic paths lie in a vertical plane and intersect at right angles. The third acoustic path runs between two fingers, one of which is longer than and the other shorter than those defining the first two paths. The resulting path is inclined at 45° with respect to the vertical plane.

4 Claims, 2 Drawing Figures

THREE-AXIS CURRENT METER

BACKGROUND OF THE INVENTION

1. Field of the Invention

The present invention relates to oceanographic measurement systems, and more particularly to a three-axis current meter for measuring all three components of current velocity in the absence of self-interference caused by the wake of the sensor supports.

2. Description of the Prior Art

Current meters have been developed to measure the differential travel time of acoustic signals traveling with and against the fluid flow. This concept has been implemented by (1) short pulse using two transmitters and two receivers for each axis, (2) short pulse using two transducers each acting as both a transmitter and receiver, (3) dual "sing-around" sound velocimeters with straight line sound paths in opposite directions, (4) continuous wave using two widely different high frequency carriers, and (5) continuous wave bursts using a single frequency on a single pair of transducers. The first three methods require the measurement of arrival time differences of pulses with sufficient speed to resolve currents less than 1 cm/sec and the fourth method requires the measurement of phase differences to very short time resolutions which require extremely high speed circuitry and auto calibration features.

The fifth method allows a slower time measurement which drastically simplifies the circuitry and eliminates the requirement for ultra high speed circuitry and for auto calibration. A current configuration provides two vertically separated horizontal acoustic paths which intersect at 120° and a third vertical path through the intersection point. This spatial arrangement ensures that no wake of any transducer crosses any of the acoustic paths, but there is still some self-interference present which limits the sensitivity of the meter.

SUMMARY OF THE INVENTION

Accordingly, the present invention provides a three-axis current meter for measuring all three components of current velocity in the absence of self-interference caused by the sensor supports. Acoustic transducers for measuring the current components are mounted in "fingers" which are pointed in the upstream direction. Two of the acoustic paths lie in a vertical plane and intersect at right angles. The third acoustic path runs between two fingers, one of which is longer than and the other shorter than those defining the first two paths. The resulting path is inclined at 45° with respect to the vertical plane.

Therefore, it is an object of the present invention to provide a three-axis current meter which is free from self-interference by sensor supporting struts.

Other objects, advantages and novel features of the present invention will be apparent from the following detailed description when read in conjunction with the appended claim and attached drawing.

DESCRIPTION OF THE PREFERRED EMBODIMENT

Figure 1:
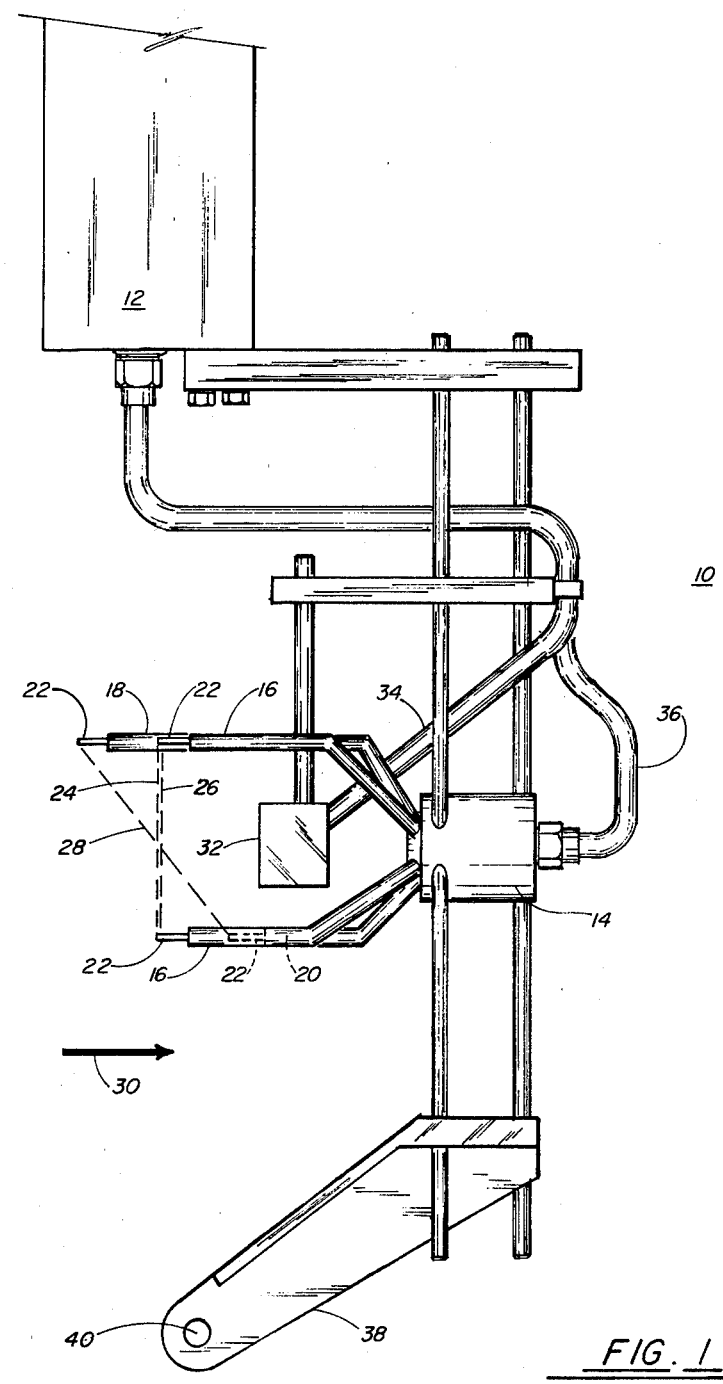
FIG. 1 is a side plan view of a current meter according to the present invention.
Figure 2:
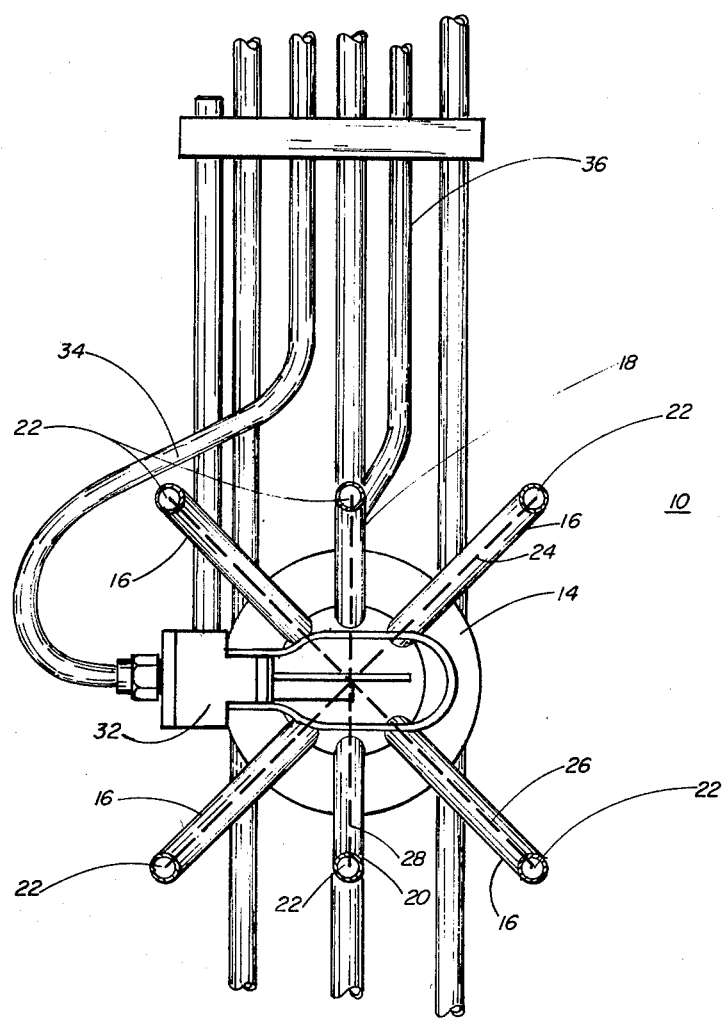
FIG. 2 is a front plan view of the current meter.

Referring now to FIGS. 1 and 2 a three-axis acoustic current meter is shown together with a conventional CTD profiler. A sensor assembly 10 is mounted below a pressure case 12 which houses processing electronics and other instruments such as accelerometers, etc. A sensor base 14 is mounted on the sensor assembly 10. From the sensor base 14 protrude a plurality of "fingers" 16,18,20 having acoustic transducers 22 at their tips. Four of the fingers 16 are equal in length and situated such that the acoustic axes 24,26 between opposing fingers, indicated by dashed lines in the drawing, lie in a vertical plane with respect to the sensor assembly and intersect at right angles. The third acoustic axis 28, indicated by a dashed line in the drawing, runs between the longer finger 18 and the shorter finger 20 and is inclined at 45° with respect to the plane formed by the orthogonal axes 24,26. These three acoustic paths 24,26,28 measure the fluid current in a skewed coordinate system. Typical path lengths are approximately 20 cm.

The fingers 16,18,20 project forward from the sensor assembly 10 into the direction of movement of the water, as indicated by the heavy arrow 30. A conventional CTD sensor head 32 is also mounted on the sensor assembly 10 such that it nestles within the "palm" formed by the fingers 16,18,20 behind the acoustic transducer 22 on the shorter finger 20, i.e., downstream of the acoustic paths 24,26,28. The CTD sensor head 32 and sensor base 14 are electrically connected to the pressure case 12 by appropriate cables 34,36.

Since the instrument is intended for deployment in an over-the-side mode from a slowly moving ship, a vane (not shown) is mounted to the pressure case 12. The vane orients the instrument so that the fingers 16,18,20 are pointed in the upstream direction. A fitting 38 is provided at the bottom of sensor assembly 10 having a hole 40 by which weights may be attached to provide additional vertical stability.

In operation the profiler incorporating the three-axis current meter gathers data while being lowered over-the-side from a slowly moving ship to study oceanographic velocity and density features having vertical scales of 10 cm or greater. With the vane maintaining the fingers pointed in the upstream direction the flow induced by the horizontal and vertical instrument motions impinges on the current meter from forward and somewhat below the direction of the fingers, and passes virtually undisturbed across the three acoustic paths. Departures in direction from this mean flow of up to 50° in any direction by local velocity anomalies are likewise sampled with little disturbance. All measured quantities are digitized, multiplexed and transmitted up a standard cable to the ship where the velocity is computed using well known velocity measuring techniques.

Thus, the present invention provides a three-axis current meter which uses the acoustic phase-comparison technique and which avoids flow disturbances by surrounding structure, resulting in a several-fold increase in accuracy.

What is claimed is:

1. A three-axis current meter comprising:
   a sensor assembly; and
   a plurality of acoustic transducers mounted on the tips of fingers projecting upstream from said sensor assembly, said fingers being mounted on said sensor assembly, and said acoustic transducers defining three intersecting acoustic paths which form a skewed coordinate system.

2. A three-axis current meter as recited in claim 1 further comprising means for adding weights to the bottom of said sensor assembly to provide enhanced vertical stability.

3. A three-axis current meter as recited in claims 1 or 2 wherein said coordinate system comprises:
two of said acoustic paths being orthogonal to each other and defining a first vertical plane orthogonal to the upstream direction; and
the third of said acoustic paths lying in a second vertical plane orthogonal to said first vertical plane, said third acoustic path intersecting said first vertical plane at an angle of 45°.

4. A three-axis current meter as recited in claims 1 or 2 wherein said fingers comprise:
four fingers situated relative to each other such that the tips form the corners of a square;
a fifth finger longer than said four fingers, said fifth finger being situated at the midpoint of the top of said square; and
a sixth finger shorter than said four fingers, said sixth finger being situated at the midpoint of the bottom of said square such that a line from the tip of said fifth finger to the tip of said sixth finger intersects the vertical plane defined by said four fingers at an angle of 45°.

* * * * *